United States Patent [19]

Saeki

[11] Patent Number: 5,309,442
[45] Date of Patent: May 3, 1994

[54] ISDN TERMINAL SYSTEM

[75] Inventor: Takashi Saeki, Hino, Japan

[73] Assignee: Kabushiki Kaisha Toshiba, Kanagawa, Japan

[21] Appl. No.: 813,269

[22] Filed: Dec. 24, 1991

[30] Foreign Application Priority Data

Dec. 26, 1990 [JP] Japan .................................. 2-407086

[51] Int. Cl.$^5$ ................................................ H04J 3/12
[52] U.S. Cl. .................................. 370/110.1; 370/74.1
[58] Field of Search ................... 370/110.1, 50, 100.1, 370/105.1, 94.1, 60; 379/79, 100, 353, 237, 387; 358/442

[56] References Cited

U.S. PATENT DOCUMENTS

| | | | |
|---|---|---|---|
| 4,939,774 | 7/1990 | Sawada | 379/353 |
| 4,961,185 | 10/1990 | Sawada | 370/79 |
| 5,077,727 | 12/1991 | Suzuki | 370/50 |
| 5,077,734 | 12/1991 | Ohtsuka | 370/100.1 |

Primary Examiner—Douglas W. Olms
Assistant Examiner—Dang Ton
Attorney, Agent, or Firm—Finnegan, Henderson, Farabow, Garrett & Dunner

[57] ABSTRACT

Disclosed is an ISDN terminal system which can automatically select one exchange method according to terminal equipments to communicate with. The ISDN terminal system 1 which can selectively adopt the line exchange or packet exchange comprises an analyzing section 203 for analyzing a call setup message received from the ISDN 3 to recognize the exchange mode designated by the calling terminal equipment, and exchange mode selecting sections 213, 103, 107 and 109 for selectively adopt either one of the line exchange or the packet exchange according to the exchange mode recognized by the analyzing section. The system further comprises an input section 11 for inputting compacted telephone numbers, a memory section 15 for registering telephone numbers previously determined according to the compacted telephone numbers and the previously determined exchange modes, reading sections 209 and 207 for reading the previously registered telephone number and exchange mode from the storing section in response to the inputted compacted number, transmitting sections 201 and 105 for forming a call setup message including information indicative of the read telephone number and exchange mode and transmitting the formed message to the ISDN 3, and exchange mode selecting sections 213, 103, 107, and 109 for selectively adopt either one of the line exchange or the packet exchange according to the read exchange mode.

13 Claims, 5 Drawing Sheets

ISDN TERMINAL SYSTEM

BACKGROUND OF THE INVENTION

The present invention relates to an ISDN (integrated service digital network) terminal system used in connection with an ISDN.

Em an ISDN exchange method, there exist two modes, line exchange and packet exchange. In the conventional ISDN terminal system, only one of the above two exchange modes can be used. Therefore, there exists a problem in that the terminal system can communicate with only the terminal systems using the same exchange mode, and cannot communicate with those of a different exchange mode.

SUMMARY OF THE INVENTION

The object of the present invention is to provide an ISDN terminal system which can automatically select one of the exchange modes according to the terminal systems to communicate with.

In the first aspect of the present invention, the present invention provides an ISDN terminal system connected to an ISDN, comprising: first communicating means for performing data communications with the ISDN in accordance with a predetermined communication method for line exchange through the ISDN; second communicating means for performing data communications with the ISDN in accordance with a predetermined communication method for packet exchange through the ISDN; analyzing means for analyzing a call setup message incoming from the ISDN, to obtain exchange mode information; and control means responsive to the exchange mode information from the analyzing means, for selecting one of the first and second communicating means and activating the selected communicating means.

Further, in the second aspect of the present invention, the present invention provides an ISDN terminal system connected to an ISDN comprising: first communicating means for performing data communications with the ISDN in accordance with a predetermined communication method for line exchange through the ISDN; second communicating means for performing data communications with the ISDN in accordance with a predetermined communication method for packet exchange through the ISDN; storing means for storing predetermined exchange mode information; transmitting means for reading the exchange mode information from the storing means, forming a call setup message including the read exchange mode information, and transmitting the formed message to the ISDN; and control means for selecting one of the first and second communicating means in accordance with the read exchange mode information and activating the selected means.

DESCRIPTION OF THE PREFERRED EMBODIMENTS

Figure 1:
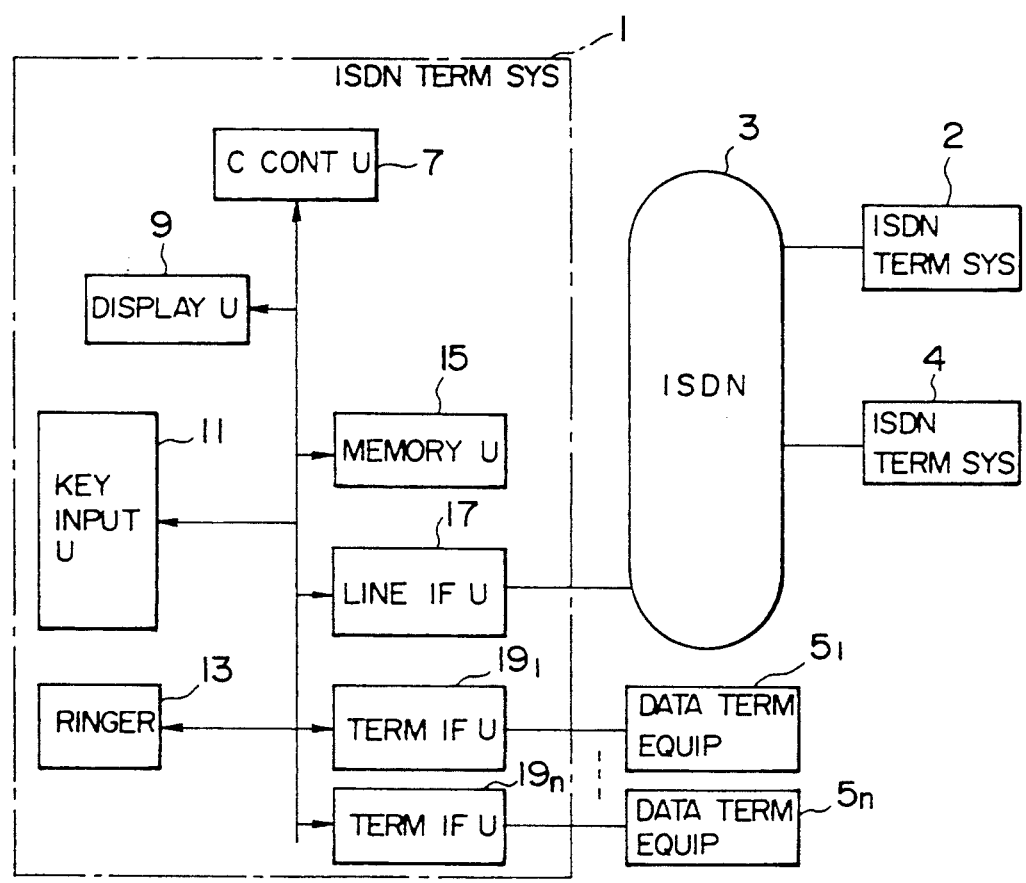
FIG. 1 is a block diagram showing the entire system configuration of an embodiment of the ISDN terminal system related to the present invention.

FIG. 1 shows the entire system configuration of one embodiment of the ISDN terminal system related to the present invention. In FIG. 1, an ISDN 3 and a plurality of data terminal equipments $5_1$ to $5_n$ (e.g. personal computers) are connected to an ISDN terminal system. The ISDN terminal system 1 controls the incoming call acceptance (referred to as ICA, hereinafter) and the outgoing call origination (referred to as OCO, hereinafter), and relays communication data in such a way that the respective data terminal equipments $5_1$ to $5_n$ can communicate with other ISDN terminal systems 2 and 4 connected to the ISDN 3 irrespective of the exchange modes of these other terminal systems. For example, where the ISDN terminal system 2 is of the D-channel packet communication type and the ISDN terminal system 4 is of the line exchange communication type (speed matching V110), the ISDN terminal system 1 selects the D-channel packet exchange mode in communications with the terminal system 2, and the line exchange mode (speed matching: V110) in communications with the terminal system 4 so that the mutual communications can be relayed.

The ISDN terminal system 1 includes a central control unit 7, a display unit 9, a key input unit 11, a ringer 13, a memory unit 15, a line interface unit 17, and terminal interface units $19_1$ to $19_n$.

The central control unit 7 is a microcomputer operated in accordance with programs for instance, which control the respective internal units arranged within the ISDN terminal system 1 (described later in further detail).

The display unit 9 is a liquid crystal panel, for instance, which displays information inputted through the key input unit 11, for instance, in response to commands given from the central control unit 7.

Figure 2:
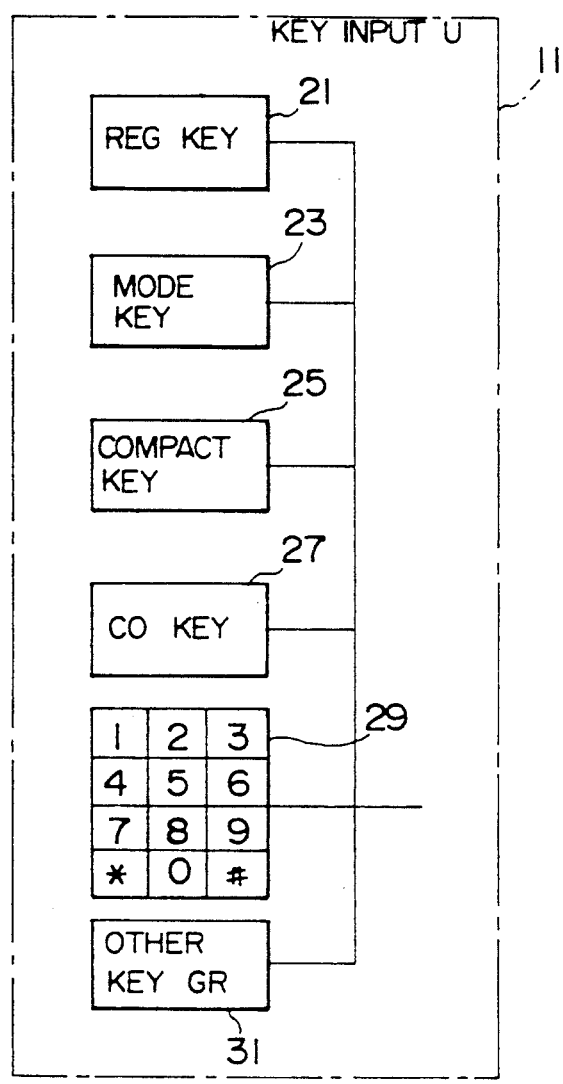
FIG. 2 is a block diagram showing a key input unit of the embodiment shown in FIG. 1.

The key input unit 11 includes a registration key 21, a mode key 23, a compacted telephone number key 25, a call originating key 27, a dial key matrix having numeral keys ("0" to "9"), and another key group 31, as shown in FIG. 2.

Figure 3:
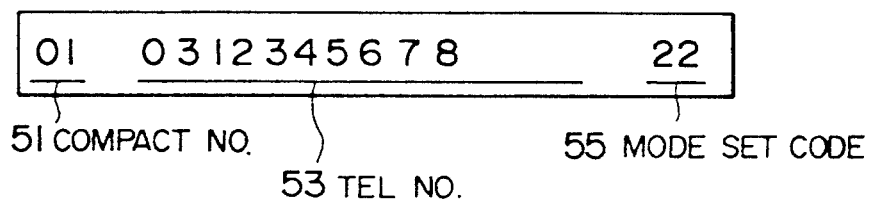
FIG. 3 is an illustration showing an exemplary registration of a compacted telephone number in the embodiment shown in FIG. 1.

Any given telephone numbers can be registered as compacted telephone numbers by use of the registration key 21, the compacted telephone number key 25 and the dial key matrix 29 in combination. Further, various information can be registered by use of the registration key 21 and the dial key matrix 29 in combination. By use of these functions, for instance, it is possible to previously register the exchange modes selectable by the ISDN terminal system 1 (the line exchange and packet exchange; the kinds of speed matching mode in the line exchange, D-channel packet and B-channel packet in the packet exchange, etc.), the terminal conditions of the respective data terminal equipments $5_1$ to $5_n$ (synchronizing mode, asynchronizing mode, the degree of data speed, etc.), the exchange modes and terminal conditions of the external ISDN terminal systems having telephone numbers registered as compacted telephone numbers, etc. FIG. 3 shows an example of registration of a compacted telephone number, in which "01" designates a compacted number; "0312345678" designates a telephone number; and "22" designates a code representative of the exchange modes and terminal equipment conditions.

Further, a call origination (CO) to the ISDN 3 with respect to any given telephone number can be made by use of the call origination key 27 and the dial key matrix 29 in combination. Furthermore, a call origination (CO) to the ISDN 3 with respect to any given compacted telephone number can be made by use of the call origination key 17, the compacted key 25 and the dial key matrix 29 in combination. The mode key 23 is used to manually select one of the line exchange and packet exchange modes. However, the ISDN terminal system 1 is provided with the function of automatically selecting the exchange mode, as described later in detail.

The ringer 13 generates a calling sound in response to a command from the central control unit 7 at the call acceptance from the ISDN 3.

The memory section 15 is a location at which the kind of exchange modes selected through the key input unit 11, the conditions of the respective data terminal equipments $5_1$ to $5_n$, the telephone numbers corresponding to the compacted numbers, etc. are registered.

The line interface unit 17 connected to the ISDN 3 provides an interface for communications between the central control unit 7 and the ISDN 3. The terminal interface units $19_1$ to $19_n$ connected to the data terminal equipments $5_1$ to $5_n$ provide interfaces for communications between the central control unit 7 and the respective data terminal equipments $5_1$ to $5_n$.

Figure 4:
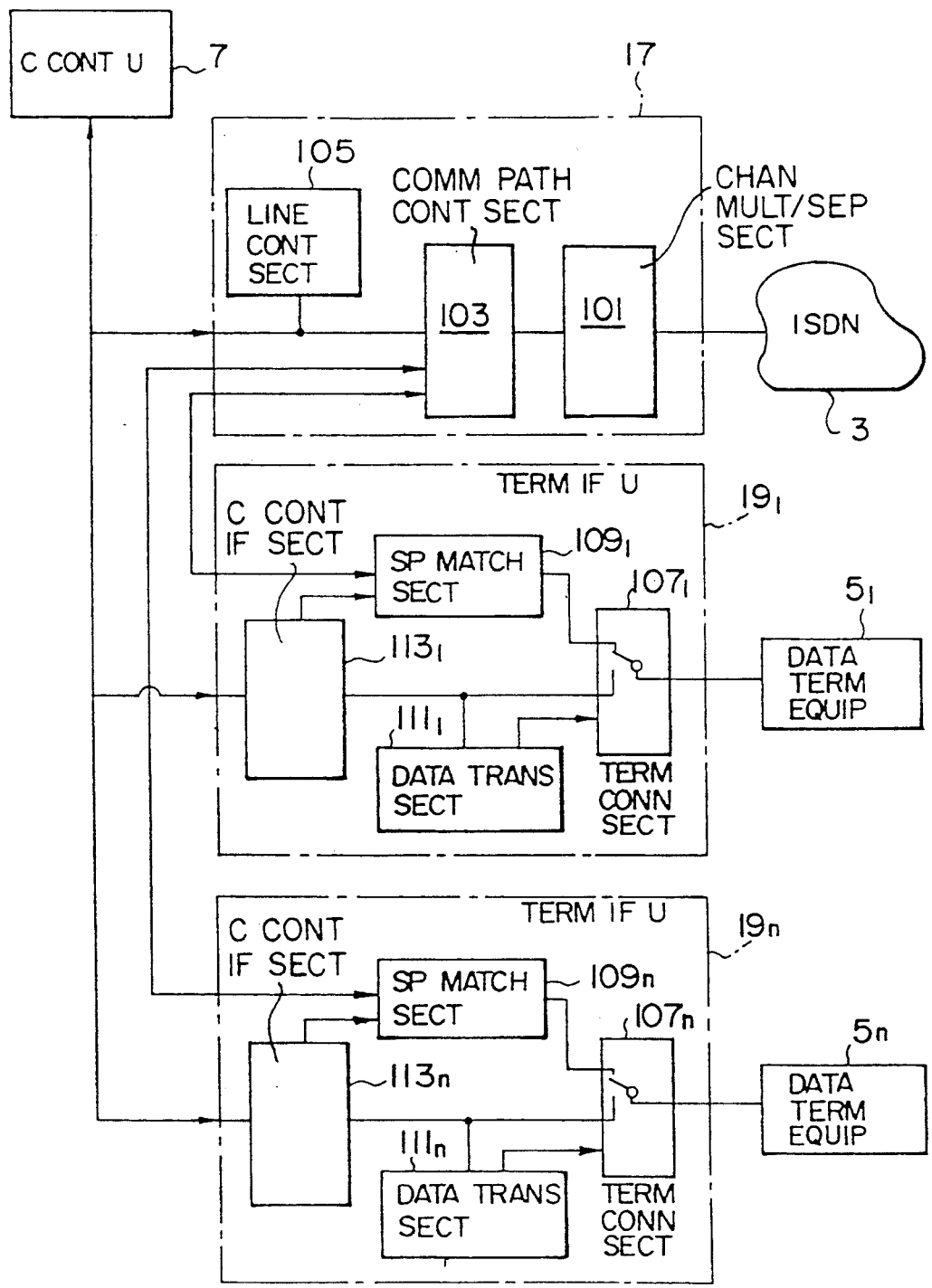
FIG. 4 is a block diagram showing an internal configuration of the line interface unit and the terminal interface units of the embodiment shown in FIG. 1.

FIG. 4 shows an internal configuration of the line interface unit 17 and the terminal interface units 191 to $19_n$. As shown in FIG. 4, the line interface unit 17 includes a channel multiplex/separate section 101, a communication path control section 103 and a line control section 105.

In this line interface unit 17, the channel multiplex/separate section 101 is provided with a function for separating a series of data strings received via the ISDN 3 into the respective time division channel data transmitted via the B1, B2 and D channels and transmitting these separated channel data to the communication path control section 103, and additionally for multiplexing the respective data received from the communication path control section 103 via the B1, B2 and D channels into a series of data strings and transmitting these multiplexed data to the ISDN 3.

The communication path control section 103 is provided with a function for selectively connecting any one of the B1, B2 and D channels from the channel multiplex/separate section 101 to the line control section 105 or a speed matching section 109 in the terminal interface unit 19. In more detail, during control of call origination and call acceptance, the D channel is connected to the line control section 105; during data communications based upon the packet exchange, any one communicating channel of B1, B2 and D channels is connected to the line control section 105; and during data communications based upon the line exchange, any one communicating channel of the B1 and B2 channels is connected to the speed matching section 109 in the terminal interface unit 19.

The line control section 105 functions as an interface for communicating control signals between the communication path control section 103 and the central control unit 7, and for transferring communication data in communications based upon the packet exchange.

The terminal interface units $19_1$ to $19_n$ are all the same in configuration, each of which includes a terminal connecting section 107, a speed matching section 109, a data transferring section 111, and a central control interface section 113.

In the terminal interface unit 19, the terminal connecting section 107 selectively connects the data terminal equipment 5 to the speed matching section 109 or the data transferring section 111. In more detail, the data terminal equipment 5 is connected to the speed matching section 109 in communications based upon the line exchange, and to the data transferring section 111 in communications based upon the packet exchange.

The speed matching section 109 matches data transfer speed with 64 Kbps so that communication data from the terminal connecting section 107 can be transferred to the communication path control section 103 in the line interface unit 17 or vice versa in communications based upon the line exchange. There are several speed matching modes of V110, V120, etc., each of which can be selected in accordance with a command from the central control unit 7.

The data transferring section 111 controls the connection switching of the terminal connecting section 107 in accordance with a control signal from the central control unit 7, and the data transfer between the terminal connecting section 107 and the central control interface section 113 in communications based upon the packet exchange.

The central control interface section 113 functions as interfaces for control signal communications between the speed matching section 109 and the central control unit 7 and between the data transferring section 111 and the central control unit 7, and for communication data transfer in communications based upon the packet exchange.

In the configuration as described above, in the case of data communications based upon the line exchange, B1 or B2 channel data are transferred by way of the data terminal equipment 5, the terminal connecting section 107, the speed matching section 109, the communication path control section 103, the channel multiplex/separate section 101, and the ISDN 3. Further, in the case of data communications based upon the package exchange, B1, B2 or D channel data are transferred by way of data terminal equipment 5, the terminal connecting section 107, the data transferring section 111, the central control interface section 113, the central control unit 7, the line control section 105, the communication path control section 103, the channel multiplex/separate section 101, and the ISDN 3.

Figure 5:
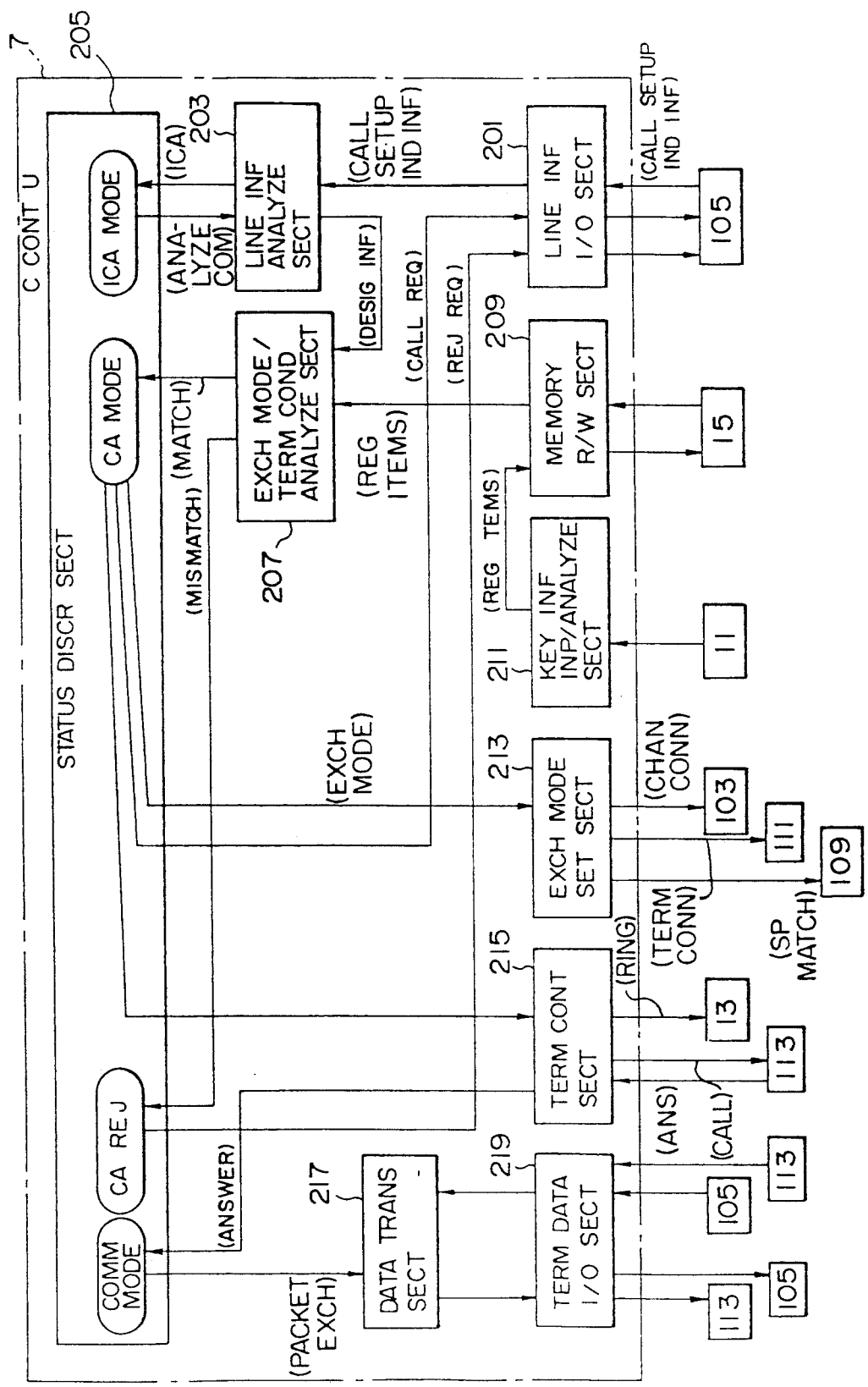
FIG. 5 is a block diagram for assistance in explaining the function of the central control unit of the embodiment shown in FIG. 1 at call acceptance (CA)
Figure 6:
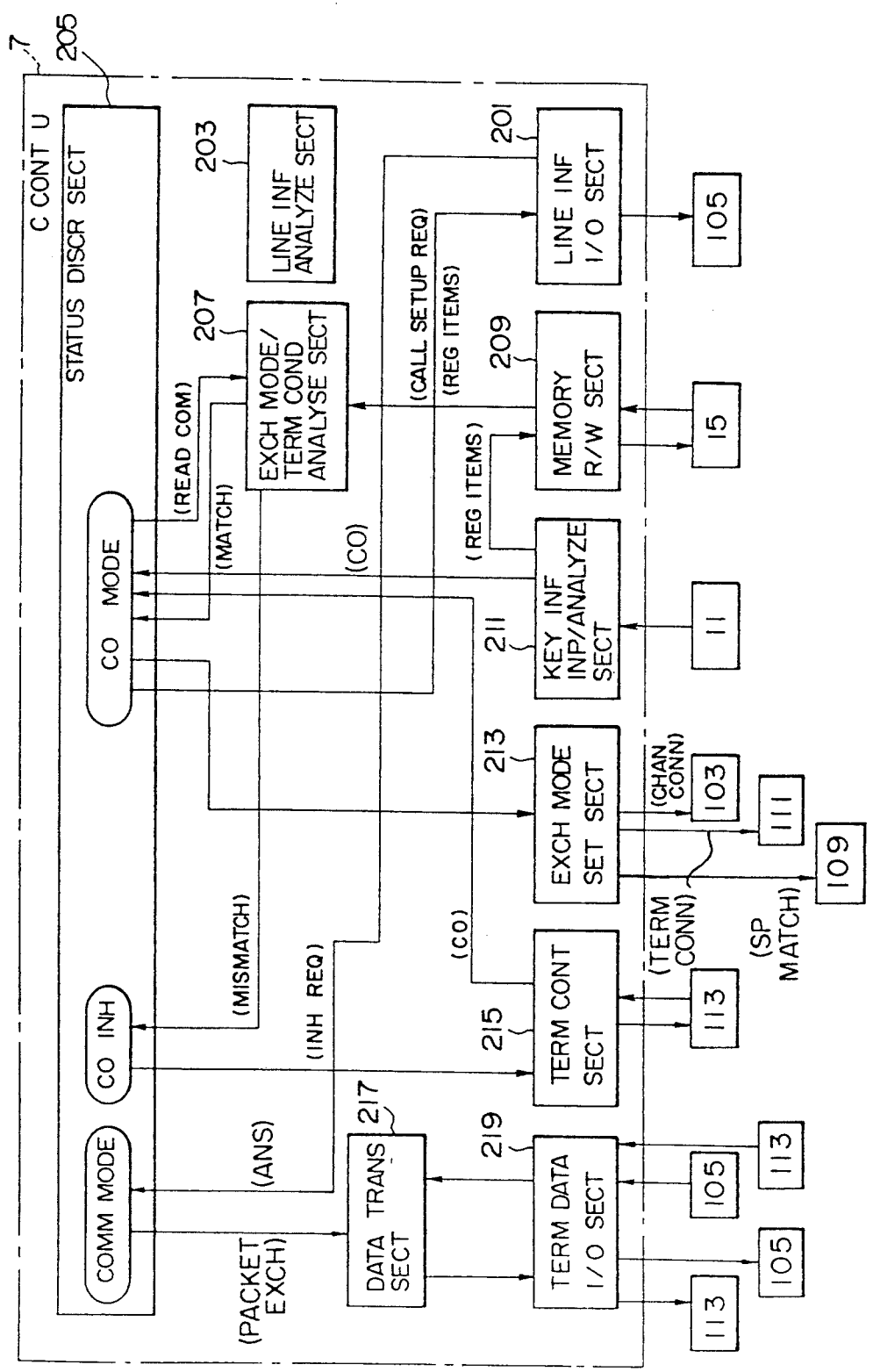
FIG. 6 is a block diagram for assistance in explaining the function of the central control unit of the embodiment shown in FIG. 1 at call origination (CO).

FIGS. 5 and 6 are functional block diagrams for assistance in explaining the central control unit 7. FIG. 5 shows the function activated in response to an incoming call acceptance (ICA) from the ISDN 3, and FIG. 6 shows the function activated in response to an outgoing call origination (OCO) to the ISDN 3.

With reference to FIG. 5, the function of the central control unit 7 at the ICA will first be described hereinbelow. The ICA from the ISDN 3 is generated when a call setup message arrives as the D channel signal This call setup message includes various information elements. The difference in the exchange mode between the line exchange and the packet exchange is described in the information element of "bearer capability". In the case of the packet exchange, the selection of either D channel packet or B channel packet is included in "D channel selection indicator" of the information element "channel identification". Further, in the case of the line exchange, the selection of speed matching mode with respect to the support capability of the terminal equipment to communicate with is included in "user information layer (1) protocol" of the information element "lower layer compatibility". The call setup message is transferred to the line control section 105 from the channel multiplex/separate section 101 via the communication path control section 103 in the line interface unit 17. The line control section 105 transmits the call setup message information to the central control unit 7 as call setup indicator information.

In the central control unit 7, this call setup indicator information is given to a line information analyze section 203 via a line information input/output section 201. Then, the line information analyze section 203 informs a status discriminate section 205 of the arrival of the call setup indicator information. As a result, the status discriminate section 05 is set to the ICA mode to output a command to analyze the call setup indicator information. In response to this command, the line information analyze section 203 analyzes the call setup indicator information, recognizes various items designated by the call setup indicator information, and informs an exchange mode/terminal condition analyze section 207 of these recognized items. The recognized items are an extension telephone number of the data terminal equipment to be called; the exchange mode (the line exchange or packet exchange, V110 or V120 speed matching mode in the line exchange, D or B channel packet in the packet exchange, etc.); the synchronous or asynchronous mode in terminal equipment conditions; the data transfer speed, the window size, the throughput class, etc. in packet exchange, and so on.

The exchange mode/terminal condition analyze section 207 reads selectable exchange modes previously registered from the memory unit 15 via a memory read/write section 209, and the terminal conditions of a data terminal equipment to be called. Further, the information as described above has previously been inputted through the key input unit 11, analyzed by a key information input/analyze section 211, and registered in the memory unit 15 via the memory read/write section 209. The exchange mode/terminal condition analyze section 207 compares these registered items read from the memory unit 15 with the items designated by the line information analyze section 203. As a result, where the designated exchange mode (e.g. the line or packet exchange, the speed matching mode in the line exchange, D or B channel packet in the packet exchange, etc.) is included in the registered selectable exchange modes and additionally the designated terminal conditions match the registered terminal conditions, the exchange mode/terminal condition analyze section 207 informs the status discriminate section 205 of the matching of conditions together with the extension telephone number of the designated data terminal equipment and the designated exchange mode, so that the status discriminate section 205 is set to a call acceptance mode.

On the other hand, when the designated exchange mode is not included in the registered selectable exchange modes or the designated terminal conditions do not match the registered terminal conditions, the exchange mode/terminal condition analyzing section 207 informs the status discriminate section 205 of the mismatching of conditions, so that the status discriminate section 205 is set to a call acceptance rejection mode.

When the call acceptance mode is set, the status discriminate section 205 transmits the designated exchange mode, and the extension telephone number of the designated data terminal equipment to an exchange mode setting section 213. Then, the exchange mode setting section 213 transmits a control signal for setting the designated exchange mode to the line interface unit 17 and the terminal interface unit (e.g. $19_1$) of the designated data terminal equipment. The control signal transmitted to the line interface unit 17 is given to the communication path control section 103 via the line control section 105. In response to this control signal, the communication path control section 103 connects the designated (B1 or B2) channel to the speed matching section $109_1$ in the terminal interface unit 191 in the case of the line exchange, and the designated (B1, B2 or D) channel to the line control section 105 in the case of the packet exchange. Further, the control signal transmitted to the terminal interface unit $19_1$ is given to the data transfer section 111 via the central control interface section $113_1$. In response to this control signal, the data transfer section $111_1$ controls the terminal connecting section $107_1$ to connect the data terminal equipment 51 to the speed matching section $109_1$ in the case of the line exchange, and to the data transfer section $111_1$ in the case of the packet exchange. In addition, in the case of the line exchange, the control signal is given from the central control section 7 to the speed matching section $109_1$ via the central control interface section $113_1$ to command the speed matching section $109_1$ to select the speed matching mode.

Thereafter, the status discriminate section 205 transmits a call request to the line control section 105 in the line interface section 17 via the line information input/output section 201. In response to this call request signal, the line control section 105 transmits a call message to the ISDN 3.

Further, the status discriminate section 205 commands the terminal control section 215 to activate the ringer 13, and transmits a control signal (for calling) to the central control interface section $113_1$ in the terminal interface unit $19_1$, so that the data terminal equipment $5_1$ is called.

On the other hand, in the case of the call acceptance rejection, the status discriminate section 205 transmits the rejection request to the line control section 105 in the line interface unit 17 via the line information input/output section 201. In response to the rejection request, the line control section 105 generates a release complete message and transmits it to the ISDN 3 via the communication path control section 103 and the channel multiplex/separate section 101.

When the data terminal equipment $5_1$ is called in the call acceptance mode as described above, if the data terminal equipment $5_1$ answers the call, this answer is transmitted from the central control interface section $113_1$ in the terminal interface unit $19_1$ to the central control unit 7, and further to the status discriminate section 205 via the terminal control section 215. Therefore, the status discriminate section 205 changes to the communication mode, so that the data terminal equipment $5_1$ starts the data communications. In this communication mode, the data transfer section 217 and the terminal data input/output section 219 are activated in the case of the packet exchange, so that communication data are transferred between the line interface unit 17 and the terminal interface unit $19_1$. On the other hand, in the case of the line exchange, data are transferred directly between the line interface unit 17 and the terminal interface unit $19_1$ without being passed through the central control unit 7.

As described above, in the ICA mode, the exchange modes can be automatically selected according to the calling terminal system.

With reference to FIG. 6, the function at call origination will be described hereinbelow. The call origination operation starts when a called telephone number or a called compacted number together with the control signal indicative of a call origination are inputted from a data terminal equipment (e.g. $5_1$) to the central control unit 7 or when the similar information is inputted through the key input unit 11. The function will be explained hereinbelow by taking the case where a call origination is generated by the data terminal equipment $5_1$ by use of a compacted number. In the central control unit 7, the terminal control section 215 transmits the input information from the data terminal equipment $5_1$ to the status discriminate section 205, so that the status discriminate section 205 changes to the call origination mode.

In this call origination mode, the status discriminate section 205 commands the exchange mode/terminal condition analyze section 207 to read the registered items from the memory unit 11. Then, the exchange mode/terminal condition analyze section 207 reads the previously registered items from the memory unit 15 via the memory read/write section 209. The previous registered items are the terminal conditions of the calling data terminal equipment $5_1$, the telephone number corresponding to an inputted compacted number, and the coded exchange mode of the called data terminal equipment corresponding to the telephone number. Subsequently, the exchange mode/terminal condition analyze section 207 compares the read terminal conditions of the data terminal equipment $5_1$ with those of the called data terminal equipment. If both match with each other, the matching result is transmitted to the status discriminate section 205 together with the telephone number, the exchange mode, and the terminal conditions of the called terminal equipment, which are all read as described above. On the other hand, if both do not match, the exchange mode/terminal condition analyze section 207 transmits the mismatching result to the status discriminate section 205.

In response to the matching information, the status discriminate section 205 informs the exchange mode setting section 213 of the read exchange mode. Then, the exchange mode setting section 213 controls the line interface unit 17 and the terminal interface unit $19_1$ in the same way as with the case of the call acceptance, as already described, to set the indicated exchange mode. Subsequently, the status discriminate section 205 transmits a call setup request to the line control section 105 in the line interface unit 17 via the line information input/output section 201. This call setup request includes the telephone number, the exchange mode, and the terminal conditions of the called data terminal equipment all read as already explained. In response to this call setup request, the line control section 105 forms a call setup message including the telephone number, exchange mode and terminal conditions of the called terminal equipment, and transmits the formed message to the ISDN 3.

On the other hand, in response to the mismatching information, the status discriminate section 205 is set to a call origination inhibition mode, and transmits an inhibition request to the central control interface section $113_1$ in the terminal interface unit $19_1$ via the terminal control section 215. Then, the central control interface section $113_1$ informs the data terminal equipment $5_1$ of the call origination inhibition.

As described above, after a call setup message has been transmitted to the ISDN 3, when the called terminal system answers the call setup message, a control signal indicative of the answer is inputted from the ISDN 3 to the central control unit 7 via the line interface unit 17. This answer signal is given to the status discriminate section 205 via the line information input/output section 201, so that the status discriminate section 205 is set to the communication mode. The operation in this communication mode is the same as with the case of the call acceptance as already explained.

As described above, when a call origination is transmitted by use of a compacted number, the exchange mode of the called data terminal equipment previously registered together with the compacted number can be selected automatically. Further, when a call origination is transmitted by use of a telephone number without use of a compacted number, the exchange mode can be selected by manually using the mode key 23 of the key input unit 11 or by selecting one exchange mode from among the used exchange modes previously registered according to data terminal equipments, etc.

In the above-mentioned embodiment, items peculiar to the individual data terminal equipments $5_1$ to $5_n$ (e.g. data speed) are previously registered, and these items are so controlled as to match those of the terminals to communicate with at both the call acceptance and origination controls. However, it is not necessarily required to previously register these items peculiar to the individual data terminal equipments $5_1$ to $5_n$. These items can be set individually whenever the respective data terminal equipments are connected to the ISDN terminal system.

As described above, in the ISDN terminal system according to the present invention, at call acceptance, the exchange mode of the calling terminal equipment can be recognized on the basis of call setup message, and further the exchange mode of its own terminal system is automatically selected so as to match the recognized exchange mode. Further, at the call origination, the exchange mode of its own terminal system is automatically selected so as to match the exchange mode of the called terminal equipment previously stored. Therefore, it is possible to freely perform data communications between the ISDN terminal system and the other terminals to communicate with, irrespective of the types of exchange modes of the terminals to communicate with.

What is claimed is:

1. An ISDN terminal system connected between a data terminal, having a data processing device for processing data received from an ISDN, and an integrated service digital network (ISDN) to which various other ISDN terminal systems having line exchange and packet exchange communication modes are connected, in which said line exchange communication mode exchanges data by connecting data terminals upon a communication request and exclusively using a communication line between the connected data terminals until a connection therebetween is released, and said packet exchange communication mode exchanges data by dividing data to be transmitted into a plurality of packets, each having a destination and a predetermined length, such that data terminals on transmission and reception sides only occupy channels when transmitting or receiving one of said packets without exclusive possession of any communication line, said ISDN terminal system comprising:

analyzing means for analyzing a call setup message attached to data received from said ISDN, said call setup message including a telephone number and exchange mode information indicating whether the received data is processed using said line exchange communication mode or said packet exchange communication mode;

line exchange communication means for, when said data received from said ISDN has been transmitted from one of said other ISDN data terminal systems using the line exchange communication mode, establishing a communication using said line exchange communication mode by matching a data transfer speed of said data terminal to a data transfer speed of the transmitting ISDN data terminal system;

packet exchange communication means for, when said data received from said ISDN has been transmitted from one of said other ISDN data terminal systems using the packet exchange communication mode on a particular time-division channel, establishing a communication using the packet exchange communication mode by setting a time-division channel of said data terminal to the particular channel used by the transmitting ISDN data terminal system; and control means for controlling a communication between said ISDN and said receiving data terminal by generating a changeover control signal indicating whether said receiving data terminal should be connected with said line exchange communication means or said packet exchange communication means based on said exchange mode information obtained by said analyzing means, and by selecting a communication path connected between said receiving data terminal and said ISDN to include either said line exchange communication means or said packet exchange communication means in response to said changeover control signal.

2. The ISDN terminal system according to claim 1, wherein said control means comprises:

communication path control means for coupling the selected one of said line exchange communication means and said packet exchange communication means to one channel of said ISDN used for data communications; and terminal connection means for coupling the selected one of said line exchange communication means and said packet exchange communication means to said data terminal.

3. The ISDN terminal system according to claim 1, further comprising multiplex/division means connected between said control means and said ISDN, for multiplexing and dividing communications on a plurality of channels for said ISDN.

4. The ISDN terminal system according to claim 1, wherein said analyzing means obtains terminal condition information representing conditions of said data terminal along with said exchange mode information by analyzing the call setup message, and transmits said terminal condition and exchange mode information to said control means; and said control means comprises:

memory means for storing previously selected exchange mode information and terminal condition information of said data terminal, comparing means for comparing said exchange mode information and said terminal condition information obtained by said analyzing means with the exchange mode and terminal condition information stored in said memory means, and selecting means for selecting one of said line exchange communication means and said packet exchange communication means when the comparing means indicates that the exchange mode and terminal control information obtained by said analyzing means matches the exchange mode and terminal condition information stored in said memory means.

5. The ISDN terminal system according to claim 4, wherein said control means transmits a call signal to the data terminal when said comparing means indicates a match, and activates the selected one of said line exchange communication means and packet exchange communication means when said data terminal answers the transmitted call signal.

6. The ISDN terminal system according to claim 4, further comprising transmitting means for transmitting a release complete message to said ISDN when said comparing means indicates that the exchange mode and terminal control information obtained by said analyzing means does not match the exchange mode and terminal condition information stored in said memory means.

7. An ISDN terminal system connected between a data terminal, having a data processing device for processing data received from an ISDN, and an integrated service digital network (ISDN) to which various other ISDN terminal systems having line exchange and packet exchange communication modes are connected, in which said line exchange communication mode exchanges data by connecting data terminals upon a communication request and exclusively using a communication line between the connected data terminals until a connection therebetween is released, and said packet exchange communication mode exchanges data by dividing data to be transmitted into a plurality of packets, each having a destination and a predetermined length, such that data terminals on transmission and reception sides only occupy channels when transmitting or receiving one of said packets without exclusive possession of any communication line, said ISDN terminal system comprising:

line exchange communications means for establishing a communication using said line exchange communication mode by matching a data transfer speed of data transmitted from said data terminal with a desired data transfer speed for transmission through said ISDN;

packet exchange communication means for establishing a communication using said packet exchange communication mode by setting a time-division channel on which data is transmitted from said data terminal to a desired time-division channel for transmitting said data through said ISDN;

storing means for storing said data transfer speed set by said line exchange communications means and said time-division channel set by said packet exchange communication means as predetermined exchange mode information;

transmitting means for transmitting a call setup message to said ISDN using one of said packet exchange communication mode or said line exchange communication mode, said call setup message being formed from at least a telephone number and said exchange mode information read out from said storing means; and control means for controlling a communication path of data transmitted from said data terminal in accordance with said exchange mode information included in said call setup message, by selecting either said line exchange communication means or said packet exchange communication means for transmission of data to said ISDN.

8. The ISDN terminal system according to claim 7, wherein said control means comprises:

communications path control means for coupling the selected one of said line exchange communication means and said packet exchange communication means to one channel of said ISDN used for data communications; and terminal connecting means for coupling the selected one of said line exchange communication means and said packet exchange communication means to said data terminal.

9. The ISDN terminal system according to claim 7, wherein said data terminal comprises input means for inputting a previously determined compacted number;

said storing means stores a previously determined telephone number corresponding to the compacted number; and said transmitting means receives the compacted number inputted by said input means from the data terminal, reads said exchange mode information and a telephone number corresponding to said compacted number from said storing means, forms a call setup message including said exchange mode information and said telephone number read out from said storing means, and transmits said call setup message to said ISDN.

10. The ISDN terminal system according to claim 9, wherein said storing means further stores terminal condition information representing conditions of a plurality of said data terminals; and said transmitting means reads said terminal condition information together with said exchange mode information and the telephone number from said storing means and includes the read information in the cell setup message.

11. The ISDN terminal system according to claim 10, wherein said storing means stores previously determined terminal information representing conditions of a plurality of data terminals connected to the ISDN terminal system, said previously determined terminal information for each data terminal corresponding to the telephone number of that data terminal; and said transmitting means comprises comparing means for comparing terminal condition information representing conditions of each of said data terminals with said previously determined terminal condition information, forming a call setup message when a match occurs, and transmitting the formed call setup message to said ISDN.

12. The ISDN terminal system according to claim 10, wherein said control means transmits a call origination inhibition to said data terminal when said terminal condition information representing conditions of each of said data terminals does not match said previously determined terminal condition information.

13. The ISDN terminal system according to claim 7, wherein said control means activates the selected one of said line exchange communication means and said packet exchange communication means when said control means receives answer information of a called party from said ISDN after a call setup message has been transmitted to the ISDN.

* * * * *